(12) United States Patent
Akif et al.

(10) Patent No.: US 12,319,214 B2
(45) Date of Patent: Jun. 3, 2025

(54) DEFORMATION DEVICE AND BUMPER OF A MOTOR VEHICLE

(71) Applicant: Bayerische Motoren Werke Aktiengesellschaft, Munich (DE)

(72) Inventors: Oeztzan Akif, Munich (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 290 days.

(21) Appl. No.: 17/910,070

(22) PCT Filed: Mar. 3, 2021

(86) PCT No.: PCT/EP2021/055339
§ 371 (c)(1),
(2) Date: Sep. 8, 2022

(87) PCT Pub. No.: WO2021/180545
PCT Pub. Date: Sep. 16, 2021

(65) Prior Publication Data
US 2023/0098180 A1     Mar. 30, 2023

(30) Foreign Application Priority Data
Mar. 10, 2020   (DE) ...................... 10 2020 106 435.7

(51) Int. Cl.
*B60R 19/18* (2006.01)
*B60Q 1/04* (2006.01)
*B60R 19/50* (2006.01)

(52) U.S. Cl.
CPC ............ *B60R 19/18* (2013.01); *B60Q 1/0491* (2013.01); *B60R 19/50* (2013.01); *B60R 2019/505* (2013.01)

(58) Field of Classification Search
CPC ....... B60R 19/18; B60R 19/50; B60R 19/023; B60R 2019/505; B60R 2019/186; B60R 2019/1893; B60R 21/34; B60Q 1/0491
(Continued)

(56) References Cited

U.S. PATENT DOCUMENTS

| | | | | |
|---|---|---|---|---|
| 4,061,384 A | * | 12/1977 | Montgomery | .......... B60R 19/18 293/109 |
| 4,466,646 A | * | 8/1984 | Delmastro | .............. B60R 19/50 293/138 |

(Continued)

FOREIGN PATENT DOCUMENTS

| | | | | |
|---|---|---|---|---|
| CN | 202046285 U | | 11/2011 | |
| CN | 216659818 U | * | 6/2022 | ............. B60R 19/18 |

(Continued)

OTHER PUBLICATIONS

Goto et al. (JP 2003220909 A), machine translation (Year: 2003).*
(Continued)

*Primary Examiner* — Amy R Weisberg
*Assistant Examiner* — Wenwei Zhuo
(74) *Attorney, Agent, or Firm* — Crowell & Moring LLP

(57) ABSTRACT

A deformation device for attaching to a crossmember of a bumper and for converting impact energy onto a lighting device has at least two deformation elements arranged in series and orientated in the same direction. The deformation device also has a support element which can be secured to a crossmember of a bumper, wherein the at least two deformation elements are secured to the support element. Each deformation element has an unstructured, flat surface and is designed such that the deformation elements buckle due to a force acting in a first direction and bend due to a force acting in a second direction.

14 Claims, 2 Drawing Sheets

(58) Field of Classification Search
USPC .................................. 293/120, 132, 53, 133
See application file for complete search history.

(56) References Cited

U.S. PATENT DOCUMENTS

| | | | | |
|---|---|---|---|---|
| 6,065,786 | A * | 5/2000 | Wheatley | ............... B60R 19/16 |
| | | | | 293/109 |
| 6,290,272 | B1 * | 9/2001 | Braun | .................... B60R 19/18 |
| | | | | 293/133 |
| 10,046,723 | B1 * | 8/2018 | Faruque | ................. B60R 19/18 |
| 10,640,066 | B1 * | 5/2020 | Farooq | .................... B60R 19/03 |
| 2006/0131901 | A1 | 6/2006 | Nguyen et al. | |
| 2006/0145490 | A1 | 7/2006 | Yamaguchi et al. | |
| 2008/0061567 | A1 * | 3/2008 | Mae | ........................ B60R 19/03 |
| | | | | 293/124 |
| 2009/0160203 | A1 * | 6/2009 | Garg | ....................... B60R 19/18 |
| | | | | 293/120 |
| 2009/0174200 | A1 * | 7/2009 | LaTurner | ............... B60R 19/34 |
| | | | | 293/133 |
| 2016/0046249 | A1 * | 2/2016 | Farooq | .................... F16F 7/123 |
| | | | | 293/120 |
| 2017/0334381 | A1 * | 11/2017 | Cheng | .................. B60R 19/023 |
| 2019/0308576 | A1 * | 10/2019 | Farooq | .................... B60R 19/18 |
| 2019/0308577 | A1 * | 10/2019 | Fichtinger | ............... B60R 19/18 |
| 2021/0380056 | A1 * | 12/2021 | Gunaydin | ............... B60R 19/18 |

FOREIGN PATENT DOCUMENTS

| | | | | |
|---|---|---|---|---|
| DE | 103 24 460 | A1 | 12/2004 | |
| DE | 102011107995 | A1 * | 1/2013 | ............. B60R 19/18 |
| DE | 10 2015 211 976 | A1 | 12/2016 | |
| DE | 10 2017 110 110 | A1 | 11/2017 | |
| DE | 10 2016 213 931 | A1 | 2/2018 | |
| JP | 2003220909 | A * | 8/2003 | ............. B60R 19/04 |
| WO | WO 2004/020256 | A1 | 3/2004 | |
| WO | WO-2016000959 | A1 * | 1/2016 | ............. B60R 19/18 |

OTHER PUBLICATIONS

International Search Report (PCT/ISA/210) issued in PCT Application No. PCT/EP2021/055339 dated Apr. 14, 2021 with English translation (five (5) pages).
German-language Written Opinion (PCT/ISA/237) issued in PCT Application No. PCT/EP2021/055339 dated Apr. 14, 2021 (five (5) pages).
German-language Search Report issued in German Application No. 10 2020 106 435.7 dated Nov. 17, 2020 with partial English translation (13 pages).
Regulation No. 42; Uniform rules for the approval of motor vehicles with regard to their front and rear protection devices (StoP->bars etc.). In: Bundesanzeiger-Verl: Federal Law Gazette Part / 2 / Annex vol. 1983, H. 25, pp. 31-47. ISSN 0341-1109 (20 pages).
English translation of Chinese-language Office Action issued in Chinese Application No. 202180018147.1 dated Feb. 27, 2025 (8 pages).

* cited by examiner

DEFORMATION DEVICE AND BUMPER OF A MOTOR VEHICLE

BACKGROUND AND SUMMARY

The present invention relates to a deformation device for attachment to a crossmember of a bumper and to a bumper of a motor vehicle having at least one deformation device.

It is known for a flush transition between a front headlight pane or a lighting unit and a bumper cladding to be desired in new vehicles. Until now, this could not be implemented, since two requirements relevant to approval have a conflict of aims: the corner pendulum impact effect from USPart581/ECE R-42 and the pedestrian protection effect with a leg test specimen. If there is a flush transition between the bumper cladding and the lighting unit, the lighting unit becomes damaged during the pendulum test, with the result that the vehicle cannot be approved.

In this connection, DE 10 2016 213 931 A1 discloses a bumper arrangement comprising a composite made up of fin elements, which have a flexible design. The fin elements have a sawtooth structure on their outer sides.

When the fin elements bend in a clockwise direction, the individual fins can slip relative to one another or slide along on one another despite the sawtooth structure. By contrast, when the fin elements bend in an anticlockwise direction, the sliding along is prevented by the sawtooth structure, since in this case the sawtooth structures engage in one another. As a result, the individual fin elements behave like a connected, rigid system with a significantly higher flexural stiffness than the non-connected fin elements. However, the fin elements are used merely for a bumper cladding and not for a lighting unit.

A disadvantage of this structure is the complex production of the fin elements with the sawtooth structure, on the one hand, and that these fin elements are used only between a bumper cladding and a crossmember, on the other hand.

It is therefore an object of the present invention to provide a deformation device for attachment to a crossmember of a bumper and for converting impact energy on a lighting unit, and a bumper of a motor vehicle, which deformation device and/or bumper can be produced cost-effectively, in a material-saving manner and easily, and ensure(s) that a flush surface is produced between a lighting unit and a bumper cladding.

This object is achieved according to the invention by the features of the independent claims. The dependent claims relate to further advantageous refinements.

Accordingly, a deformation device for attachment to a crossmember of a bumper and for converting impact energy on a lighting unit comprises at least two deformation elements arranged in a row and having the same orientation.

Expressed differently, the deformation device can only be used between a crossmember of a bumper and a lighting unit so that the deformation device or its deformation elements convert(s) an impact and/or the energy of the impact on a lighting unit into deformation of the deformation elements.

The deformation device furthermore comprises a carrier element, which can be secured to a crossmember of a bumper, wherein the at least two deformation elements are secured to the carrier element.

Furthermore, each deformation element has an unstructured, smooth surface and is designed such that the deformation elements buckle owing to an action of force in a first direction and bend owing to an action of force in a second direction. Thus, any deformation element having an unstructured, smooth surface can be produced easily. This is because an unstructured, smooth surface already comprises a part made of plastic or light metal, such as e.g. aluminum, after it has been injection molded or rolled. Consequently, the costs for the production can be kept low. In this respect, any surface of a deformation element may be an unstructured, smooth surface.

In addition, the first direction may be oriented parallel to the deformation elements. This makes it possible to ensure buckling of the deformation elements, since the load is introduced in the direction of the deformation elements. The second direction may also cause the deformation elements to bend around the carrier element. In respect of a comparison between buckling and bending, it should be established that a deformation element can be configured such that it resists bending to a lower extent than buckling.

It is also possible for each deformation element to have a stiffening portion for the purpose of stiffening it against bending and/or against buckling.

The stiffening portion may have a profile of any desired shape, round or angular, within the deformation element. The stiffening portion may also have a triangular or gutter-shaped form, similar to an open roof gutter. This shape can be produced easily by primary shaping or forming, such as e.g. bending. Furthermore, the stiffening portion may be arranged centrally in a deformation element.

The profile of any desired shape, round or angular, of the stiffening portion may be arranged and designed such that the stiffening portion has pressure applied to it owing to an action of force in the second direction. The use of this design makes it possible to increase the resistance of a deformation element to bending and/or buckling, since the shape produced by the stiffening portion has a higher resistance to bending and/or buckling than a deformation element without a stiffening portion.

It is furthermore possible for each deformation element to comprise a first and a second longitudinal side and a first and a second broad side, which are respectively oppositely situated, in order to form a three-dimensionally shaped body with a thickness. The first longitudinal side of the deformation elements may be secured to the carrier element, with the result that the deformation elements are upright on the carrier element, in particular are oriented perpendicularly in relation to the carrier element.

Furthermore, the shape of each deformation element may be similar to a sheet. It is also possible for each deformation element to have a width and a length that are greater than a thickness of a deformation element.

The first direction, in which the deformation elements buckle under the action of force, may run in a direction of a connecting line from the first longitudinal side to the second longitudinal side. In this respect, the first direction may run along the shortest connection between the first longitudinal side and the second longitudinal side or parallel to a first or second broad side of a deformation element. In addition, the second direction, in which each deformation element bends under the action of force, may intersect a deformation element, in particular its surface.

Furthermore, the second direction may form an angle of between 10 and 40 degrees, in particular an angle of 30 degrees, with the surface of a deformation element.

In this respect, the deformation elements may comprise plastic or aluminum or a composite substance as material. The carrier element and the deformation elements may also be formed in one piece.

It is also contemplated for a lighting unit to be able to be arranged on the second longitudinal side.

A second aspect of the present invention comprises a bumper of a motor vehicle.

It should be noted that the features of the deformation device as were mentioned under the first aspect can be applied individually or in combination with one another to the bumper.

A bumper of a motor vehicle has at least one deformation device according to the first aspect.

The bumper furthermore has a crossmember with a swept profile, wherein the at least one deformation device is secured to the crossmember. In the present case, a securing operation may be an operation of screwing or clipping the deformation device on the crossmember.

Furthermore, the crossmember may have a first, a second and a third crossmember portion. The first crossmember portion may form a blunt arrow tip of the swept profile of the crossmember and the second and the third crossmember portion may taper obliquely toward the first crossmember portion.

In addition, the first crossmember portion may be oriented transversely with respect to the direction of forward travel of a motor vehicle. In this respect, the second and the third crossmember portion may form an angle of between 10 and 40 degrees, in particular an angle of 30 degrees, with the first crossmember portion. It is also possible for the third crossmember portion to form an angle of between 10 and 40 degrees, in particular an angle of 30 degrees, with the first crossmember portion.

It is also possible for the bumper to have at least one lighting unit. The at least one lighting unit may be arranged on a deformation device, in particular on the second longitudinal side of the deformation elements of the deformation device.

It is also possible for the carrier element of the deformation device to be secured to the second and/or third crossmember portion.

A third aspect of the present invention may comprise a motor vehicle having the bumper of a motor vehicle according to the second aspect.

The concept of the invention presented above will be expressed additionally in different words below.

Proceeding first of all from the prior art, in which there is a flush transition between a bumper cladding and a lighting unit, the lighting unit is damaged in the pendulum test, with the result that a vehicle cannot be approved.

It is known from the prior art to implement a projection of the bumper cladding beyond the lighting unit in this field. This projection corresponds approximately to the value of the potential intrusion of a leg test specimen from a pedestrian protection test. Consequently, there is no flush transition between the bumper cladding and the lighting unit. However, a flush transition between the lighting unit and the bumper cladding is desired for new vehicles these days.

Until now, this demand could not be implemented, since—as already indicated—two requirements relevant to approval have a conflict of aims: the corner pendulum impact effect from USPart581/ECE R-42 and the pedestrian protection effect with the leg test specimen. If there is a flush transition between the bumper cladding and the lighting unit or its front headlight pane, it becomes damaged during the pendulum test, with the result that the vehicle cannot be approved.

Among other things, eliminating this drawback can be an object of the invention.

In this respect, the basic concept of the invention is based on the different directions of the introduction of load in the two test methods. The direction of the impact differs by approximately 30 degrees between the leg test specimen during the pedestrian protection test and the corner pendulum impact effect. This makes it possible to design a structure which can react in a stiff way when subjected to perpendicular and planar loading and in a flexible way for pedestrian protection in the event of oblique loading rotated by 30 degrees.

The invention will be explained in more detail below on the basis of an exemplary embodiment in conjunction with associated drawings.

In the following description, the same reference signs are used for the same subjects.

DETAILED DESCRIPTION OF THE DRAWINGS

Figure 1:
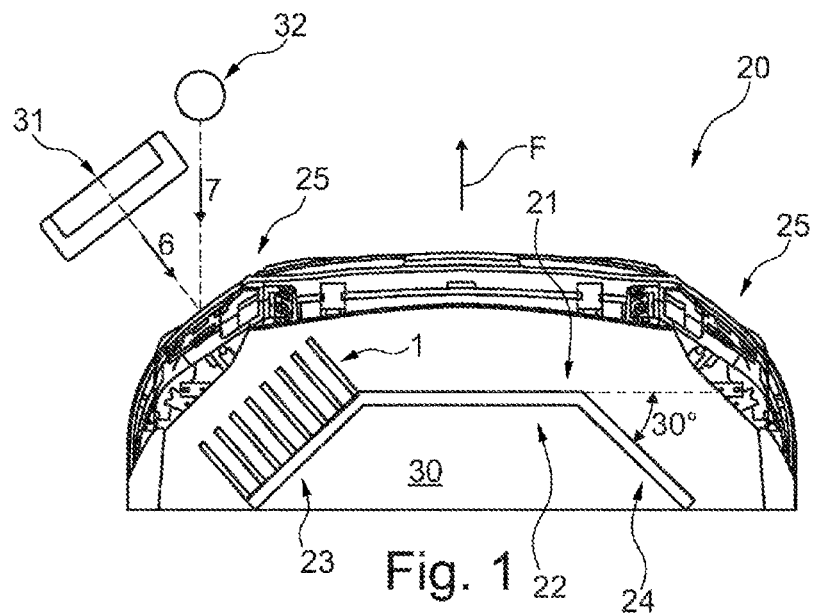
FIG. 1 is a plan view of a vehicle front with a leg test specimen and a pendulum, and the impact directions thereof on a deformation device according to the invention.

FIG. 1 is a plan view of a vehicle front 30 showing a leg test specimen 32 and a pendulum 31, and also the impact directions 6, 7 thereof on a deformation device 1 according to the invention.

More precisely, FIG. 1 shows a bumper 20 of a motor vehicle having two deformation devices 1 and having a crossmember 21 with a swept profile, wherein the deformation devices 1 are secured to the crossmember 21.

FIG. 1 also shows that the crossmember 21 has a first, a second and a third crossmember portion 22, 23, 24, wherein the first crossmember portion 22 forms a blunt arrow tip of the swept profile of the crossmember 21.

Furthermore, the second and the third crossmember portion 23, 24 taper obliquely toward the first crossmember portion 22.

While the first crossmember portion 22 is oriented transversely with respect to the direction of forward travel X of a motor vehicle, each of the second and third crossmember portions 23, 24 forms an angle of 30 degrees with the first crossmember portion 22.

FIG. 1 also shows that the bumper 20 has two lighting units 25, each of which is arranged on a deformation device 1, in particular on a second longitudinal side 9 of deformation elements 2, 3, 4 of the deformation device 1. In fact, the deformation device 1 has a multiplicity of deformation elements, but for the sake of simplicity the deformation elements 2, 3, 4 are mentioned by way of example for all of them.

Figure 2:
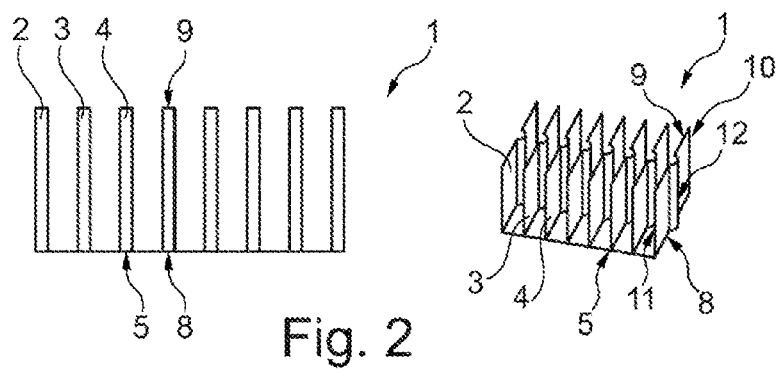
FIG. 2 shows one of the deformation devices from FIG. 1 in an unloaded state.

FIG. 2 shows one of the deformation devices 1 from FIG. 1 in an unloaded state.

The deformation device 1 for attachment to the crossmember 21 of the bumper 20 and for converting impact energy on a lighting unit 25 has multiple deformation elements 2, 3, 4 arranged in a row and having the same orientation.

The deformation device 1 also has a carrier element 5, which is secured to the crossmember 21 of the bumper 20, wherein the deformation elements 2, 3, 4 are secured to the carrier element 5.

Figure 4:
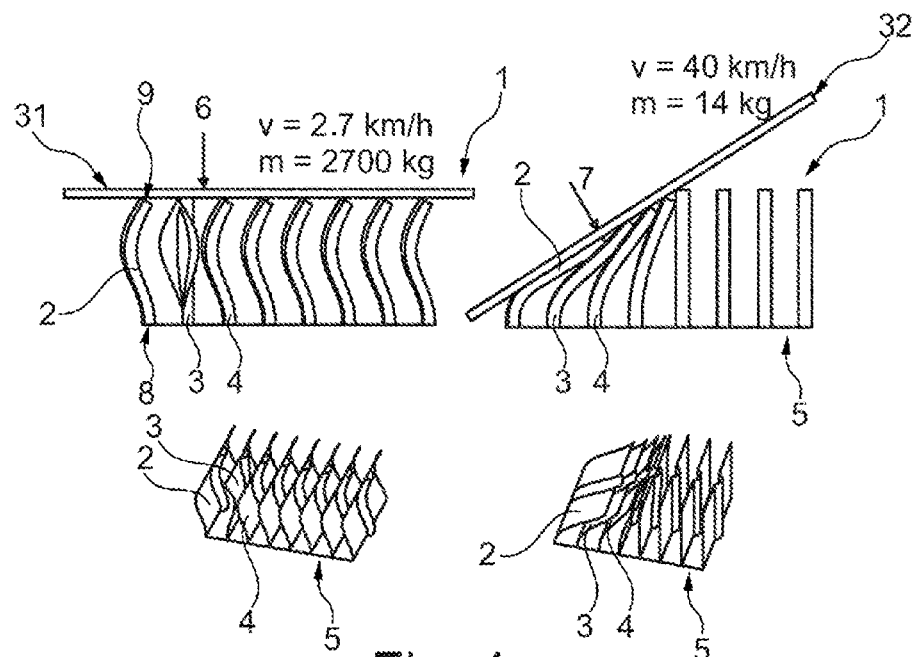
FIG. 4 shows the deformation device from FIG. 2 in a first loaded state.
Figure 5:
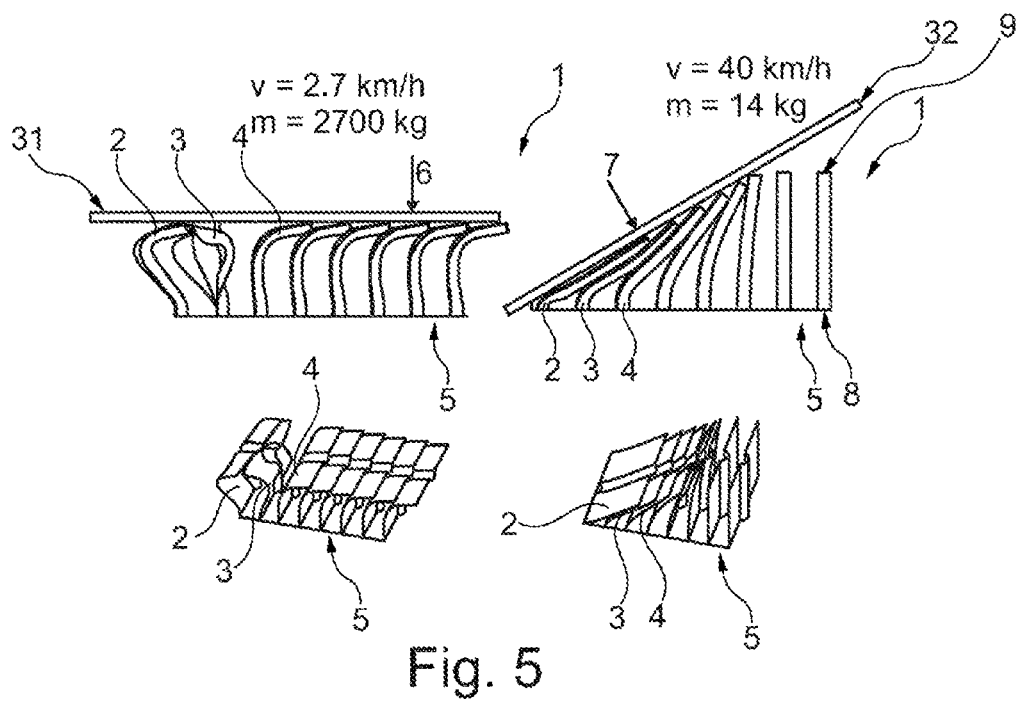
FIG. 5 shows the deformation device from FIG. 2 in a second loaded state.

Each deformation element 2, 3, 4 has an unstructured, smooth surface and is designed such that the deformation elements 2, 3, 4 buckle owing to an action of force in a first direction 6 (cf. FIGS. 4 and 5, on the left) and bend owing to an action of force in a second direction 7 (cf. FIGS. 4 and 5, on the right).

In this respect, the first direction 6 is oriented parallel to the deformation elements 2, 3, 4, wherein the second direction 7 causes the deformation elements 2, 3, 4 to bend around the carrier element 5 (cf. FIGS. 4 and 5).

FIG. 2 also shows that each deformation element 2, 3, 4 has a stiffening portion 12 for the purpose of stiffening it against bending and/or against buckling. In this respect, the stiffening portion 12 has a round profile within the deformation element 2, 3, 4.

More specifically, the stiffening portion 2 has a gutter-shaped form, similar to an open roof gutter, and is arranged centrally in each deformation element 2, 3, 4.

Furthermore, the round or gutter-shaped profile of the stiffening portion 12 is arranged and designed such that the stiffening portion 12 has pressure applied to it owing to an action of force in the second direction 7 (cf. FIGS. 4 and 5).

As FIG. 2 additionally shows, each deformation element 2, 3, 4 has a first and a second longitudinal side 8, 9 and a first and a second broad side 10, 11, which are respectively oppositely situated, in order to form a three-dimensionally shaped body with a thickness.

The first longitudinal side 8 of the deformation elements 2, 3, 4 is secured to the carrier element 5, such that the deformation elements 2, 3, 4 are oriented perpendicularly with respect to the carrier element 5.

Also according to FIG. 2, the shape of each deformation element 2, 3, 4 may be similar to a sheet, wherein each deformation element 2, 3, 4 has a width and a length that are greater than a thickness of a deformation element.

FIG. 4 shows the deformation device 1 from FIG. 1 in a first loaded state, whereas FIG. 5 shows the deformation device 1 from FIG. 1 in a second loaded state.

It is clear from the two figures that the first direction 6, in which the deformation elements 2, 3, 4 buckle under the action of force of the pendulum 31, runs in the direction of a connecting line from the first longitudinal side 8 to the second longitudinal side 9.

More specifically, the first direction 6 runs along the shortest connection between the first longitudinal side 8 and the second longitudinal side 9 or parallel to the first or the second broad side 10, 11 of the deformation elements 2, 3, 4.

It is additionally clear from FIGS. 4 and 5 that the second direction 7, in which each deformation element 2, 3, 4 bends under the action of force, intersects a deformation element 2, 3, 4, in particular its surface. In this respect, the second direction 7 forms an angle of 30 degrees with the surface of the deformation elements 2, 3, 4.

Lastly, it is noted that the deformation elements 2, 3, 4 comprise plastic or aluminum or a composite substance as material.

The carrier element 5 and the deformation elements 2, 3, 4 are also formed in one piece.

Figure 3:
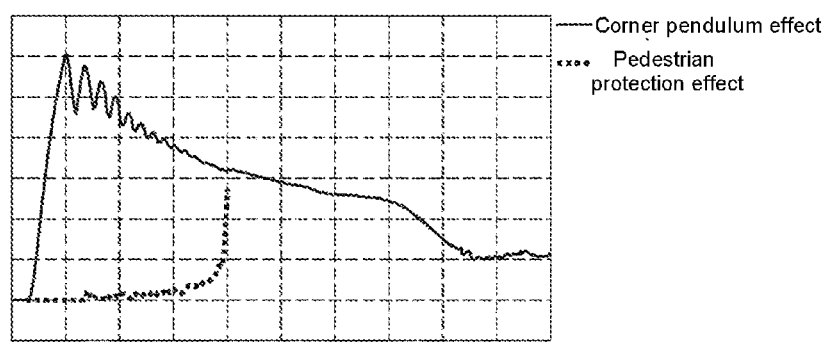
FIG. 3 is a force-time diagram for the deformation device from FIG. 2 for an impact from different directions.

With reference to FIGS. 3 to 5, an explanation will be given for the force-time diagram for the deformation device 1 from FIG. 2 for an impact from different directions.

In this respect, FIG. 4 shows the deformation device 1 from FIG. 2 in a first loaded state and FIG. 5 shows the deformation device 1 from FIG. 2 in a second loaded state, wherein the first loaded state is before the second loaded state in time.

Whereas the left-hand sides of FIGS. 4 and 5 show the collision of the deformation device 1 with the pendulum 31 from FIG. 1, the right-hand sides show the collision of the deformation device 1 with the leg test specimen 32 from FIG. 1.

Thus, the right-hand sides of FIGS. 4 and 5 show the behavior of the deformation device 1 when it acts as pedestrian protection and the left-hand sides show the behavior of the deformation device 1 in the event of a pendulum impact.

In this respect, the pendulum impact simulates e.g. what is referred to as a "parking knock" or an impact of the bumper 21 or the lighting unit 25 in front of the deformation device 1 with another car having a mass of 2700 kg at a speed of 2.7 km/h that occurs when pulling into or pulling out of a parked state.

By contrast, the impact with a leg test specimen 32 simulates an impact with a pedestrian or their leg having a mass of 14 kg at a speed of 40 km/h.

The design of the deformation device 1 causes the deformation elements 2, 3, 4 to buckle in the event of a pendulum impact, whereas an impact with the leg test specimen 32 causes the deformation elements 2, 3, 4 to bend.

FIG. 3 shows, illustratively in a force-time diagram, that the reaction of the deformation elements 2, 3, 4 or the deformation device 1 is different for the impact with the leg test specimen 32 and the pendulum impact.

With reference to FIG. 3, in the event of a pendulum impact or in the event of a corner pendulum impact at the beginning of the impact, a large amount of force is received, which is then dissipated continuously over the course of the impact by deformation.

By contrast, different behavior is exhibited in the event of an impact with the leg test specimen 32. Here, at the beginning of the impact a small amount of force is received, and only at a later point in time does more force build up against the leg test specimen 32. Consequently, the deformation device 1 is much more flexible at the start in the event of an impact with the leg test specimen 32 than in the event of a pendulum impact.

Expressed differently, the deformation device 1 is significantly stiffer for the pendulum impact than for the impact with the leg test specimen 32.

LIST OF REFERENCE SIGNS

1 Deformation device
2 Deformation element
3 Deformation element
4 Deformation element
5 Carrier element
6 First direction
7 Second direction
8 First longitudinal side
9 Second longitudinal side
10 First broad side
11 Second broad side
12 Stiffening portion
20 Bumper
21 Crossmember
22 First crossmember portion
23 Second crossmember portion
24 Third crossmember portion
25 Lighting unit 30 Vehicle front
31 Pendulum
32 Leg test specimen
F Direction of forward travel

The invention claimed is:

1. A deformation device for attachment to a crossmember of a bumper and for converting impact energy on a lighting device, comprising:
at least two deformation elements arranged in a row and having a same orientation, wherein each deformation element comprises a first and a second longitudinal side and a first and a second broad side, which are respectively oppositely situated, in order to form a three-dimensionally shaped body with a thickness; and
a carrier element, which is securable to the crossmember of a bumper, wherein
the at least two deformation elements are secured to the carrier element at the first longitudinal side so as to be oriented perpendicular to the carrier element, and
each deformation element has an unstructured, smooth surface and is configured such that the deformation elements buckle owing to an action of force in a first direction and bend around the carrier element owing to an action of force in a second direction.

2. The deformation device according to claim 1, wherein each deformation element has a stiffening portion for stiffening against bending and/or buckling.

3. The deformation device according to claim 2, wherein the stiffening portion has a profile with a defined shape within the deformation element.

4. The deformation device according to claim 3, wherein the defined shape is round or angular.

5. The deformation device according to claim 3, wherein the profile of the stiffening portion is arranged and configured such that the stiffening portion has pressure applied to it owing to an action of force in the second direction.

6. The deformation device according to claim 1, wherein the first direction, in which the deformation elements buckle under the action of force, runs in the direction of a connecting line from the first longitudinal side to the second longitudinal side.

7. The deformation device according to claim 6, wherein the second direction, in which each deformation element bends under the action of force, intersects a broad surface of the deformation element.

8. A bumper of a motor vehicle, comprising:
a deformation device as claimed in claim 1; and
a crossmember with a swept profile,
wherein the carrier element of the deformation device is secured to the crossmember.

9. The bumper according to claim 8, wherein
the crossmember has a first, a second, and a third crossmember portion,
the first crossmember portion is oriented transversely with respect to a direction of forward travel of a motor vehicle, and
the second and the third crossmember portions form an angle of between 10 and 40 degrees with the first crossmember portion.

10. The bumper according to claim 9, wherein the angle is 30 degrees.

11. The bumper according to claim 9, further comprising:
at least one lighting unit, wherein
the at least one lighting unit is arranged on the deformation device, and
the carrier element of the deformation device on which the at least one lighting unit is arranged is secured to the second or the third crossmember portion.

12. The bumper according to claim 11, further comprising:
a bumper cladding,
wherein there is a flush transition between the bumper cladding and the at least one lighting unit.

13. The bumper according to claim 9, further comprising:
first and second lighting units, wherein
the first and second lighting units are respectively arranged on respective deformation devices, and
the carrier elements of the respective deformation devices are respectively secured to the second and third crossmember portions.

14. The deformation device according to claim 1, wherein the carrier element and the at least two deformation elements are formed in one piece.

* * * * *